E. D. CHURCH.
SAFETY APPLIANCE FOR CONNECTING RODS.
APPLICATION FILED MAR. 18, 1907.
917,924.
Patented Apr. 13, 1909.
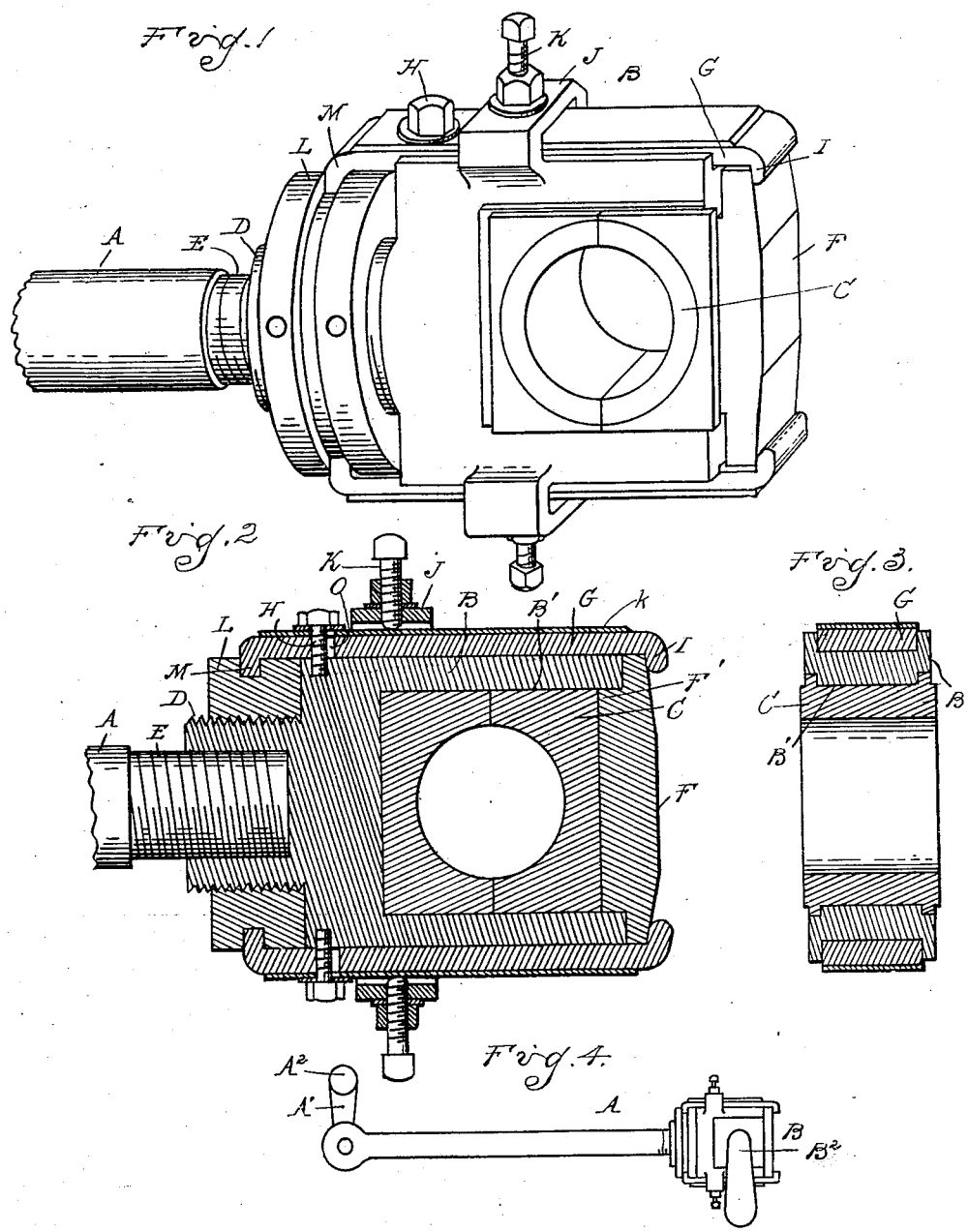

UNITED STATES PATENT OFFICE.

EDGAR D. CHURCH, OF SAGINAW, MICHIGAN, ASSIGNOR TO AMERICAN SANDSTONE BRICK MACHINERY COMPANY, OF SAGINAW, MICHIGAN, A CORPORATION OF MICHIGAN.

SAFETY APPLIANCE FOR CONNECTING-RODS.

No. 917,924.     Specification of Letters Patent.    Patented April 13, 1909.

Application filed March 18, 1907. Serial No. 363,016.

*To all whom it may concern:*

Be it known that I, EDGAR D. CHURCH, a citizen of the United States of America, residing at Saginaw, in the county of Saginaw and State of Michigan, have invented certain new and useful Improvements in Safety Appliances for Connecting-Rods, of which the following is a specification, reference being had therein to the accompanying drawings.

The invention relates to a safety appliance for use in connection with power machines, such as presses and the like, designed to relieve the connecting rod from excessive tensile strains occasioned by disarrangement of the machine elements, or the clogging of the machine, and thus prevent breakage of parts, and consists in the novel and simple construction of the safety means and in the peculiar arrangement and combination of its parts, as more fully hereinafter set forth and illustrated.

In the drawings,—Figure 1 is a perspective view of the safety appliance, associated with a connecting rod or pitman; Fig. 2 is a vertical central section therethrough; Fig. 3 is a cross section; and Fig. 4 is a diagrammatic view illustrating the application of the safety mechanism.

In the drawings thus briefly described, the reference-letter A represents a connecting rod, shown in Fig. 4 as forming the connection between a crank A' on a shaft A² and a crank arm B². The rod is provided with a head member B, which in this instance is threaded upon the rod and is of yoke-shaped configuration, within its opening B' being arranged the complementary bearings blocks or elements C. The bearing block having flanges $c$ which overlap the wall of the opening B', thereby constituting an interlocking connection between the head and bearing blocks. The head, as shown, is formed with an externally-threaded extension D, which, is bored and internally threaded to receive the threaded end E of the connecting rod. The bearing blocks, as illustrated, are removable, and are adapted to be retained within the head by means that, under excessive strain, will give way to permit of the detachment of the bearing, and thus prevent breakage of the machine parts. As illustrated, this connection comprises a retaining member or cap F, having a reduced portion F' extending partly within the head opening in contact with one of the bearing blocks C, and yielding members,—in the form of springs G,—having connection with the cap or retainer and the head proper. These springs are of the leaf type, adapted to be secured by a suitable bolt, as H, to the head, and at their free ends are turned inwardly, as at I, to form an engaging hook for the retainer. For the purpose of varying the amount of resistance to the strains imposed upon the connecting rod, I provide means for varying the tension of the spring,—in the form of members J,—on opposite sides of the head, having openings to permit of the extension therethrough of the springs, and set-screws K on said members adapted to bear upon protecting plates $k$ of any suitable construction and adapted to rest against the spring. Means are also provided for adjusting the connection between the bearing and connecting rod head, so as to accommodate bearings of different size. The means shown consist of a grooved collar L on the extension D of the head, into which inturned projections M on the inner spring ends extend, the bolt openings O being elongated to permit of the adjustment by the longitudinal movement of the springs.

From the description of the safety appliance, its operation will be obvious, excessive strains imposed upon the connecting rod causing the bearing and its cap to be forced outwardly from beneath the springs, thus yielding to the strain and preventing the breaking of other parts of the machine. The amount of resistance offered to the strain is varied by means of the set-screw K, and the position of the springs varied, and the proper adjustment made for the bearing, by rotating the grooved collar the required amount.

What I claim as my invention is,—

1. A device of the character described comprising a connecting rod, a yoke-shaped head for the rod, a cap member bridging the space between the arms of the yoke member and automatically releasable retaining means for the cap.

2. A device of the character described, comprising a connecting rod, a yoke-shaped head, a sectional bearing in the head, a cap member bridging the space between the arms of the yoke arranged to hold the bearing in place, and automatically releasable retaining means for the cap.

3. In a device of the character described, a connecting rod, a head member secured thereto, an automatically removable bearing in the head, a spring pressed retainer for the bearing carried by the head, and an adjustable collar also upon the head for adjusting the retainer.

4. In a device of the character described, a connecting rod, a yoke-shaped head member thereon, an automatically removable bearing in the head, a cap member engaging the head opening and forming a retainer for the bearing, and leaf springs adjustably connected to the head, forming a yielding connection between the latter and the retainer.

5. A connecting rod comprising a threaded end section, a yoke-shaped head engaging said section, bearings in the head, a retaining-cap for the bearings extending within the head opening, an adjustable grooved collar upon the head, and leaf springs adjustably connected to the head, having inturned end portions engaging the bearing retainer and collar.

6. In combination, a yoke-shaped head adapted to support a bearing therein, a cap member engaging the head opening and adapted to form a retainer for the bearing, and leaf springs connecting respectively with the head and cap member.

In testimony whereof I affix my signature in presence of two witnesses.

EDGAR D. CHURCH.

Witnesses:
 E. MAY EXCELL,
 EDITH ZOELLER.